US012704456B2

(12) United States Patent
Hahn et al.

(10) Patent No.: US 12,704,456 B2
(45) Date of Patent: Aug. 11, 2026

(54) METHOD FOR DETERMINING AMMONIUM

(71) Applicant: HACH LANGE GMBH, Berlin (DE)

(72) Inventors: Markus Hahn, Berlin (DE); Heinz Rudde, Berlin (DE); Maik Heuwold, Berlin (DE); Markus Lenhard, Berlin (DE); Andreas Golitz, Berlin (DE); Sebastian Minke, Berlin (DE); Andreas Schwenk, Berlin (DE); Andreas Jonak, Berlin (DE); Sven Bergmann, Berlin (DE); Bas De Heij, Berlin (DE)

(73) Assignee: HACH LANGE GMBH, Berlin (DE)

( * ) Notice: Subject to any disclaimer, the term of this patent is extended or adjusted under 35 U.S.C. 154(b) by 609 days.

(21) Appl. No.: 18/044,895

(22) PCT Filed: Sep. 1, 2021

(86) PCT No.: PCT/EP2021/074094
§ 371 (c)(1),
(2) Date: Mar. 10, 2023

(87) PCT Pub. No.: WO2022/053364
PCT Pub. Date: Mar. 17, 2022

(65) Prior Publication Data

US 2023/0358671 A1 Nov. 9, 2023

(30) Foreign Application Priority Data

Sep. 10, 2020 (EP) .................................... 20195516

(51) Int. Cl.
*G01N 21/31* (2006.01)
*G01N 21/78* (2006.01)
*G01N 31/22* (2006.01)

(52) U.S. Cl.
CPC ........... *G01N 21/314* (2013.01); *G01N 21/78* (2013.01); *G01N 31/22* (2013.01)

(58) Field of Classification Search
CPC ....... G01N 21/314; G01N 21/78; G01N 31/22
See application file for complete search history.

(56) References Cited

U.S. PATENT DOCUMENTS 5,620,900 A 4/1997 Tanzer
6,315,950 B1 * 11/2001 Harp .................... G01N 33/182
436/125
2009/0320570 A1 12/2009 Wiese
2018/0284099 A1 10/2018 Ayyub et al.
2019/0265219 A1 * 8/2019 Olt ........................ G01N 31/22

OTHER PUBLICATIONS

European Patent Office, International Search Report and Written Opinion, Nov. 9, 2021, 10 pages.

* cited by examiner

*Primary Examiner* — Dennis White
(74) *Attorney, Agent, or Firm* — Ference & Associates LLC

(57) ABSTRACT

A method for the determination of a plausibility of a measurement result of a determination of an ammonium content of an aqueous sample. The method includes providing a blue indole dye mixture of the aqueous sample, determining a first extinction value of the blue indole dye mixture in a first absorption region, determining a second extinction value of the blue indole dye mixture in a second absorption region, dividing the first extinction value by the second extinction value so as to obtain a quotient, and determining the measurement result to not be plausible if the quotient ≥1.1.

11 Claims, 3 Drawing Sheets

| Wavelength in nm | Concentration ppm $NH_4$-N | | | | |
|---|---|---|---|---|---|
| | 1 | 2 | 5 | 10 | 1000 |
| 500 | 0.054 | 0.049 | 0.093 | 0.12 | 0.113 |
| 505 | 0.049 | 0.047 | 0.093 | 0.127 | 0.127 |
| 510 | 0.046 | 0.046 | 0.096 | 0.136 | 0.145 |
| 515 | 0.043 | 0.047 | 0.100 | 0.147 | 0.164 |
| 520 | 0.042 | 0.048 | 0.107 | 0.162 | 0.188 |
| 525 | 0.041 | 0.05 | 0.115 | 0.180 | 0.214 |
| 530 | 0.042 | 0.053 | 0.124 | 0.198 | 0.241 |
| 535 | 0.042 | 0.057 | 0.135 | 0.220 | 0.271 |
| 540 | 0.044 | 0.062 | 0.149 | 0.247 | 0.308 |
| 545 | 0.046 | 0.067 | 0.164 | 0.274 | 0.346 |
| 550 | 0.048 | 0.073 | 0.181 | 0.306 | 0.388 |
| 555 | 0.051 | 0.080 | 0.200 | 0.344 | 0.436 |
| 560 | 0.055 | 0.087 | 0.220 | 0.381 | 0.484 |
| 565 | 0.058 | 0.095 | 0.241 | 0.418 | 0.531 |
| 570 | 0.062 | 0.104 | 0.265 | 0.463 | 0.586 |
| 575 | 0.067 | 0.113 | 0.290 | 0.510 | 0.642 |
| 580 | 0.072 | 0.123 | 0.318 | 0.564 | 0.704 |
| 585 | 0.076 | 0.133 | 0.344 | 0.612 | 0.758 |
| 590 | 0.082 | 0.143 | 0.374 | 0.667 | 0.817 |
| 595 | 0.087 | 0.154 | 0.404 | 0.723 | 0.875 |
| 600 | 0.092 | 0.165 | 0.434 | 0.780 | 0.930 |
| 605 | 0.098 | 0.177 | 0.466 | 0.840 | 0.985 |
| 610 | 0.104 | 0.188 | 0.497 | 0.899 | 1.037 |
| 615 | 0.109 | 0.200 | 0.528 | 0.957 | 1.084 |
| 620 | 0.115 | 0.211 | 0.560 | 1.017 | 1.130 |
| 625 | 0.121 | 0.222 | 0.590 | 1.073 | 1.168 |
| 630 | 0.126 | 0.233 | 0.618 | 1.126 | 1.199 |
| 635 | 0.131 | 0.243 | 0.645 | 1.179 | 1.222 |
| 640 | 0.135 | 0.252 | 0.670 | 1.226 | 1.233 |
| 645 | 0.139 | 0.259 | 0.688 | 1.263 | 1.231 |
| 650 | 0.141 | 0.264 | 0.702 | 1.291 | 1.216 |
| 655 | 0.143 | 0.268 | 0.713 | 1.313 | 1.184 |
| 660 | 0.144 | 0.27 | 0.717 | 1.324 | 1.137 |
| 665 | 0.144 | 0.269 | 0.716 | 1.326 | 1.070 |
| 670 | 0.143 | 0.267 | 0.710 | 1.318 | 0.999 |
| 675 | 0.141 | 0.264 | 0.699 | 1.303 | 0.916 |
| 680 | 0.139 | 0.259 | 0.685 | 1.279 | 0.826 |
| 685 | 0.136 | 0.253 | 0.668 | 1.251 | 0.738 |

Fig. 2A

| | | | | | |
|---|---|---|---|---|---|
| 690 | 0.132 | 0.246 | 0.648 | 1.218 | 0.646 |
| 695 | 0.129 | 0.239 | 0.629 | 1.184 | 0.567 |
| 700 | 0.124 | 0.23 | 0.606 | 1.141 | 0.486 |
| 705 | 0.120 | 0.222 | 0.584 | 1.103 | 0.417 |
| 710 | 0.116 | 0.213 | 0.561 | 1.061 | 0.353 |
| 715 | 0.112 | 0.206 | 0.54 | 1.023 | 0.304 |
| 720 | 0.107 | 0.198 | 0.518 | 0.982 | 0.261 |
| 725 | 0.103 | 0.188 | 0.494 | 0.937 | 0.220 |
| 730 | 0.098 | 0.180 | 0.471 | 0.894 | 0.188 |
| 735 | 0.093 | 0.171 | 0.447 | 0.847 | 0.160 |
| 740 | 0.089 | 0.162 | 0.425 | 0.805 | 0.139 |
| 745 | 0.084 | 0.153 | 0.400 | 0.756 | 0.119 |
| 750 | 0.079 | 0.144 | 0.376 | 0.712 | 0.103 |
| 755 | 0.074 | 0.135 | 0.353 | 0.667 | 0.090 |
| 760 | 0.070 | 0.126 | 0.329 | 0.620 | 0.078 |
| 765 | 0.065 | 0.116 | 0.304 | 0.573 | 0.068 |
| 770 | 0.060 | 0.108 | 0.282 | 0.530 | 0.059 |
| 775 | 0.056 | 0.099 | 0.260 | 0.489 | 0.052 |
| 780 | 0.051 | 0.091 | 0.238 | 0.446 | 0.045 |
| 785 | 0.047 | 0.083 | 0.217 | 0.406 | 0.040 |
| 790 | 0.043 | 0.075 | 0.197 | 0.368 | 0.034 |
| 795 | 0.039 | 0.068 | 0.179 | 0.334 | 0.030 |
| 800 | 0.036 | 0.062 | 0.161 | 0.301 | 0.026 |
| 805 | 0.032 | 0.055 | 0.145 | 0.269 | 0.023 |
| 810 | 0.030 | 0.05 | 0.131 | 0.243 | 0.020 |
| 815 | 0.027 | 0.045 | 0.117 | 0.216 | 0.017 |
| 820 | 0.024 | 0.04 | 0.104 | 0.192 | 0.015 |
| 825 | 0.022 | 0.036 | 0.093 | 0.171 | 0.013 |
| 830 | 0.020 | 0.032 | 0.083 | 0.152 | 0.011 |
| 835 | 0.018 | 0.028 | 0.073 | 0.134 | 0.010 |
| 840 | 0.016 | 0.025 | 0.065 | 0.119 | 0.008 |
| 845 | 0.015 | 0.022 | 0.058 | 0.105 | 0.007 |
| 850 | 0.014 | 0.020 | 0.052 | 0.093 | 0.006 |
| 855 | 0.012 | 0.018 | 0.045 | 0.082 | 0.005 |
| 860 | 0.011 | 0.016 | 0.040 | 0.072 | 0.005 |
| 865 | 0.011 | 0.014 | 0.036 | 0.065 | 0.004 |
| 870 | 0.010 | 0.013 | 0.032 | 0.057 | 0.003 |
| 875 | 0.009 | 0.011 | 0.029 | 0.051 | 0.003 |
| 880 | 0.008 | 0.010 | 0.026 | 0.045 | 0.002 |
| 885 | 0.008 | 0.009 | 0.023 | 0.040 | 0.002 |
| 890 | 0.007 | 0.009 | 0.021 | 0.036 | 0.002 |
| 895 | 0.007 | 0.008 | 0.019 | 0.033 | 0.002 |
| 900 | 0.007 | 0.007 | 0.018 | 0.030 | 0.002 |

Fig. 2B

METHOD FOR DETERMINING AMMONIUM

The present application is a National Phase Entry of PCT International Application No. PCT/EP2021/074094, which was filed on Sep. 1, 2021, and which claims priority to Application No. 20195516.8 filed in the European Patent Office on Sep. 10, 2020, the contents of which are hereby incorporated by reference.

The present invention relates to a method for the determination of ammonium or ammonia in aqueous samples via the Berthelot method where the risk of an incorrectly low result is eliminated via an additional measurement.

Ammonium nitrogen ($NH_4$—N) is present in many above-ground water courses, in some ground waters, and in domestic and many commercial waste waters. Ammonia is present in the aquatic environment due to agricultural run-off and decomposition of biological waste. Ammonia thereby exists in water as either the ammonium ion ($NH_4^+$) or the un-ionized ammonia ($NH_3$). Un-ionized ammonia is toxic to fish, even in low concentrations, while the ammonium ion is nontoxic except at extremely high concentrations. At neutral pH=7 and ambient temperature, almost all of the ammonia exists as $NH_4^+$. As the pH and temperature increase, the amount of $NH_3$ increases and the amount of $NH_4^+$ decreases. Ammonium contents in water of 0.5 to 1 mg/I are therefore, depending on the pH of the water, classified as hazardous to fish. A water course is typically unsuitable for fishery purposes at ammonium contents of >1 mg/I.

Ammonia is also toxic to all vertebrates causing convulsions, coma and death, probably because elevated $NH_4^+$ displaces $K^+$ and depolarizes neurons, causing activation of NMDA type glutamate receptor, which leads to an influx of excessive $Ca_2^+$ and subsequent cell death in the central nervous system.

Ammonium compounds accordingly belong to the water-endangering substances, and limit values are set forth in many regulations. A regular monitoring of ammonium content in water and waste-water samples is therefore required.

Standardized methods for the determination of the ammonium content are frequently used. These include, for example, the Berthelot method where ammonia ($NH_3$) reacts with a so-called "Berthelot's reagent" to form a blue product which is then used in a colorimetric method to determine ammonia. The method is carried out at an alkaline pH, at which ammonium is in the form of ammonia ($NH_3$).

The reaction mechanism proposed for the Berthelot reaction consists of three steps. In a first step (1), ammonia reacts with hypochlorite to form monochloramine at basic pH:

The reaction mechanism proposed for the Berthelot reaction consists of three steps. In a first step (1), ammonia reacts with hypochlorite to form monochloramine at basic pH:

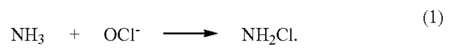

(1)

In a second step (2), the monochloramine formed reacts with a phenol derivative in the presence of the catalyst nitroprusside to give a chloroquinone monoamine:

(2)

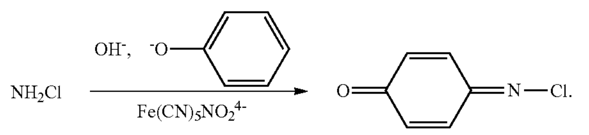

The catalyst, nitroprusside, also called sodium nitroprusside, is a complex of the empirical formula $Na_2[Fe(CN)_5NO]_2 \cdot H_2O$. Various compounds are in principle suitable as the phenol derivative. Salicylates, thymol or 2-chlorophenol can, for example, be used. In the final reaction step (3), the chloroquinone monoamine formed reacts with a further molecule of the phenol derivative to give a corresponding indophenol.

(3)

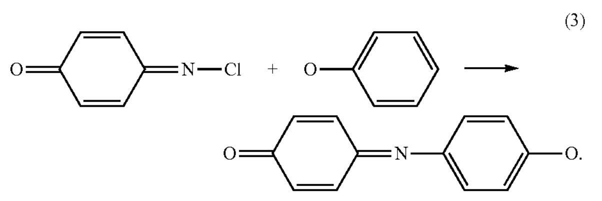

The formed indophenol has a blue color which is then measured photometrically, for example, at a wavelength in the region of its absorption maximum. In certain measurement ranges, indophenol correlates with the ammonium content of the sample.

The complete reaction mechanism has not been unambiguously clarified to date and proceeds via many intermediates.

The Berthelot method can in principle be used for various measurement ranges if the sample/reagent ratios are adapted correspondingly or the sample is pre-diluted.

Ammonium tests which use the Berthelot method are available from various manufacturers in the form of ready-to-use test sets.

The Berthelot method has the disadvantage that the blue color formed only correlates with the ammonium content in certain concentration ranges of the ammonium to be determined. The measurement signal (i.e., the extinction) of the photometric measurement generally increases with increasing ammonium content of the sample. However, the measurement signal (i.e., the extinction) then drops. FIG. 1 shows that the measurement signal of various concentrations of ammonium nitrogen ($NH_4$—N) increasing and then decreasing. While no cause of this increase and decrease has to date been clarified with certainty, one theory is that the reaction mechanism no longer proceeds completely at unfavorable analyte/reagent ratios. A pH shift due to excessive monochloramine formed may be responsible. A reliable report of the ammonium content is not possible. A measurement undertaken at the wavelength in the region of absorption maximum expected for lower concentrations (i.e., at approximately 660 nm) would falsely report the concentration of ammonium nitrogen ($NH_4$—N) which is 1,000 ppm in FIG. 1 to be between 5 and 10 ppm. This would result in a significant underestimation of the ammonium content, which might have serious repercussions for the environment.

The standards and test set manufacturers therefore prescribe that further analyses with a diluted sample (various pollution steps) should be carried out in addition to analysis of the sample in order to check the plausibility of the measurement result. This is, however, inconvenient and time-consuming for the user.

WO 2018/054797 attempted to address the above problem. WO 2018/054797 describes a method to determine the plausibility of a measurement of the ammonium content using the Berthelot method where, besides the measurement of the extinction in the absorption region of the blue indole dye formed, a measurement of the extinction in the absorption region of the nitroprusside employed as catalyst is additionally performed on the sample. If the measurement in the absorption region of the nitroprusside employed as catalyst indicates that sufficient nitroprusside is present, the result of the ammonium determination is determined to be plausible. If the measurement in the absorption region of nitroprusside indicates that little or no catalyst is present, the plausibility of the result of the ammonium determination must be doubted. The plausibility of the actual measurement result of the ammonium determination can be checked via an additional measurement of the extinction in the absorption region of nitroprusside carried out directly on the same sample. Further measurements of dilutions of the sample are thereby normally unnecessary. A disadvantage of this method is that a measurement of two different chemical compounds is required, i.e., a first measurement of the blue indole dye formed, and a second measurement of the absorption region of the nitroprusside employed as catalyst.

An object of the present invention is to provide an alternative method for the determination of the ammonium content of aqueous samples which directly provides information on the plausibility of the measurement result without the need to measure further samples, for example, as part of a dilution series. A further object of the present invention is to provide a method for the determination of the ammonium content of aqueous samples which directly provides information on the plausibility of the measurement result while only measuring the absorption regions of one chemical compound, i.e., the formed blue indole dye.

In an embodiment, the present invention provides a method for the determination of a plausibility of a measurement result of a determination of an ammonium content of an aqueous sample. The method includes providing a blue indole dye mixture of the aqueous sample, determining a first extinction value of the blue indole dye mixture in a first absorption region, determining a second extinction value of the blue indole dye mixture in a second absorption region, dividing the first extinction value by the second extinction value so as to obtain a quotient, and determining the measurement result to not be plausible if the quotient ≥1.1.

The present invention is described in greater detail below on the basis of embodiments and of the drawing in which:

FIG. 2 shows more complete data samples set forth in Tables 4-15 below.

FIG. 2B is a continuation from FIG. 2A of the more complete data samples set forth in Tables 4-15 below.

Figure 1:
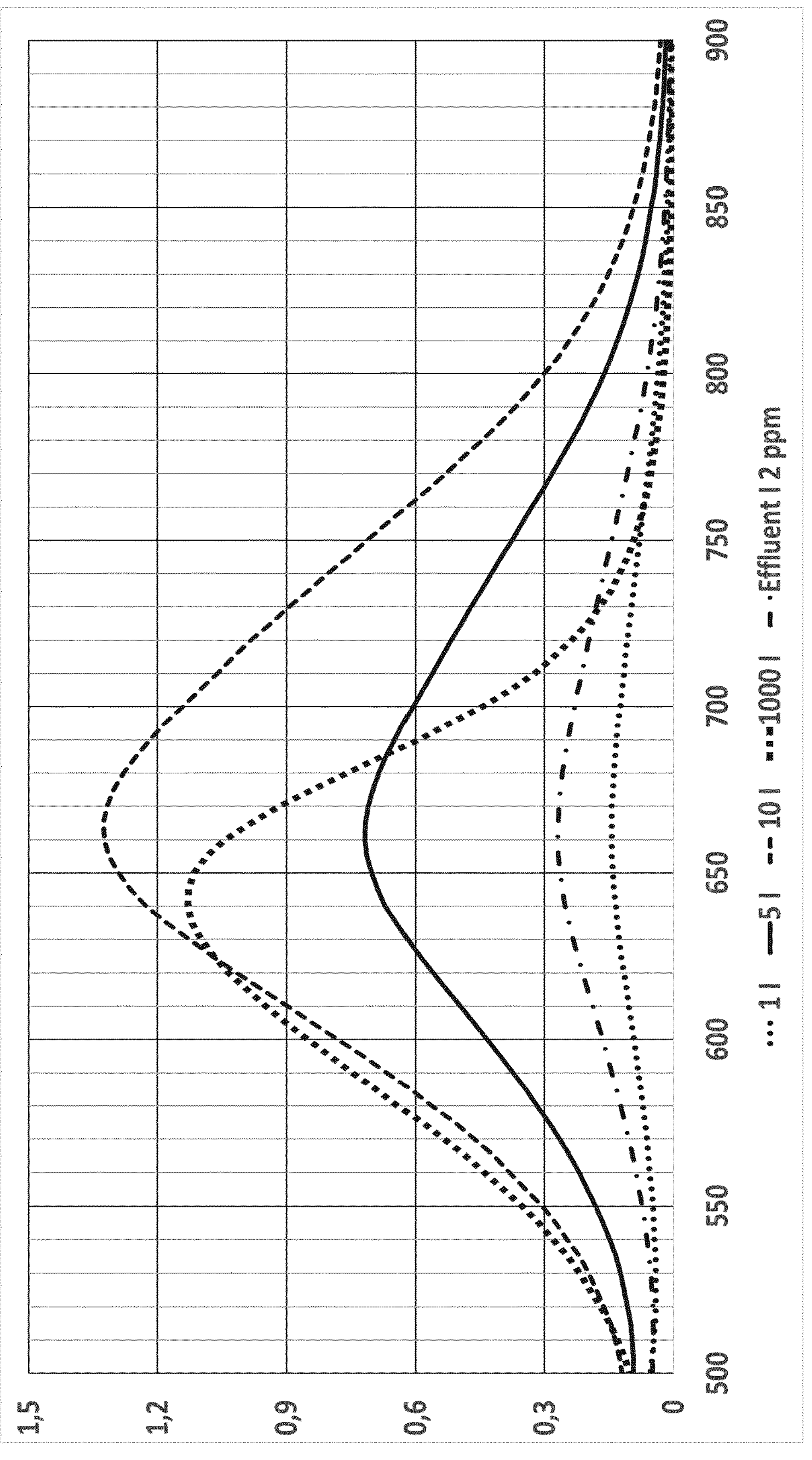
FIG. 1 shows the measured extinction in the case of the determination of the ammonium content of a sample by the Berthelot method for various ammonium concentrations.

The present invention provides a method for the determination of a plausibility of a measurement result of a determination of an ammonium content of an aqueous sample. The method includes providing a blue indole dye mixture of the aqueous sample, determining a first extinction value of the blue indole dye mixture in a first absorption region, determining a second extinction value of the blue indole dye mixture in a second absorption region; dividing the first extinction value by the second extinction value so as to obtain a quotient; and determining the measurement result to not be plausible if the quotient ≥1.1.

An "aqueous sample" as used in the present invention is a sample which contains one or typically more components dissolved in water. The aqueous sample generally contains no further solvents apart from water. It may, however, contain up to 20% of one or more water-miscible solvents, such as, for example, ethanol. An aqueous sample can be a water sample, a food or drink, or a body fluid. The aqueous sample is preferably a water sample, such as, for example, a sample taken from a water course, a waste-water sample, a ground water sample, a tap water sample, a sample of water fed to an industrial process or discharged from an industrial process as waste water, etc.

In order to determine the ammonium content quantitatively, the extinction of the sample after addition of the requisite reagents and after formation of the blue to blue-green indophenol (i.e., the blue indole dye mixture) is determined at a certain wavelength in the absorption region of the indophenol. The measurement is typically carried out at the absorption maximum of the blue indole dye mixture. The quantitative determination can then be carried out with the aid of a calibration curve. This procedure is known to the person skilled in the art. Indophenols generally have an absorption maximum in the wavelength range between 600 and 800 nm.

The quotient of the present invention will necessarily depend on the wavelengths chosen for the first absorption region and the second absorption region. The quotient can, for example, be ≥1.5, preferably ≥ 2.0, very preferably ≥3.0. The quotient can, for example, be greater than or equal to the quotients listed in Table 1.

TABLE 1

| List of Quotients 8 | | | | | | | |
|---|---|---|---|---|---|---|---|
| 1.1 | 1.5 | 1.9 | 2.3 | 2.9 | 4.75 | 7.5 | 14.0 |
| 1.15 | 1.55 | 1.95 | 2.35 | 3.0 | 5.0 | 8.0 | 15.0 |
| 1.2 | 1.6 | 2.0 | 2.4 | 3.25 | 5.25 | 8.5 | 16.0 |
| 1.25 | 1.65 | 2.05 | 2.45 | 3.5 | 5.5 | 9.0 | 17.0 |
| 1.3 | 1.7 | 2.1 | 2.5 | 3.75 | 5.75 | 10.0 | 18.0 |
| 1.35 | 1.75 | 2.15 | 2.6 | 4.0 | 6 | 11.0 | 19.0 |
| 1.4 | 1.8 | 2.2 | 2.7 | 4.25 | 6.5 | 12.0 | 20.0 |
| 1.45 | 1.85 | 2.25 | 2.8 | 4.5 | 7 | 13.0 | 21.0 |

The first absorption region is chosen at a wavelength in a region which is expected for the absorption maximum of the blue indole dye mixture. This can for example, be anywhere from 650-670 nm, preferably from 655-665 nm, very preferably at approximately 660 nm or exactly at 660 nm. Possible first absorption regions are listed in Table 2.

TABLE 2

| First Absorption Regions (in nm) | | | | | | |
|---|---|---|---|---|---|---|
| 650 | 653 | 656 | 659 | 662 | 665 | 668 |
| 651 | 654 | 657 | 660 | 663 | 666 | 669 |
| 652 | 655 | 658 | 661 | 664 | 667 | 670 |

The second absorption region is chosen to be distant from the first absorption region. While the present invention is in no way limited thereto, it has been observed that the extinction of the blue indole dye mixture is more gradual when lower concentrations of ammonium nitrogen ($NH_4$—N) are measured. Reference to FIG. 1 shows, for example, that the low concentrations of ammonium nitrogen ($NH_4$—

N) (i.e., the uppermost curve=10 ppm, third curve from the bottom=5 ppm, the curve second from the bottom=2 ppm, and the bottommost curve=1 ppm) have a more gradual extinction than does the high concentration of ammonium nitrogen ($NH_4$—N) (i.e., the curve second from the top=1,000 ppm). The curve showing the highest concentration of ammonium nitrogen ($NH_4$—N) additionally has an earlier absorption maximum (i.e., about 645 nm) than does the other lower concentrations (i.e., about 660 nm). The curve showing the highest concentration of ammonium nitrogen ($NH_4$—N) also shows an extinction having a steeper decline. A core aspect of the present invention is that a measurement in the second absorption region for a high concentration of ammonium nitrogen ($NH_4$—N) will therefore result in a quotient which is significantly different from the lower concentrations of ammonium nitrogen ($NH_4$—N). A high concentration of ammonium nitrogen ($NH_4$—N) as used herein is understood to be a concentration ≥100 ppm $NH_4$—N, for example, ≥250 ppm $NH_4$—N, for example, ≥500 ppm $NH_4$—N, for example, ≥1,000 ppm $NH_4$—N.

The second absorption region can, for example be from 665-900 nm, preferably from 670-775 nm, preferably from 700-760 nm, preferably from 710-750 nm, preferably from 720-740 nm, preferably from 725 to 735 nm, very preferably at approximately 730 nm or exactly at 730 nm. Possible second absorption regions are listed in Table 2.

TABLE 2

| Second Absorption Regions (in nm) | | | | | | |
|---|---|---|---|---|---|---|
| 665 | 699 | 733 | 767 | 801 | 835 | 869 |
| 666 | 700 | 734 | 768 | 802 | 836 | 870 |
| 667 | 701 | 735 | 769 | 803 | 837 | 871 |
| 668 | 702 | 736 | 770 | 804 | 838 | 872 |
| 669 | 703 | 737 | 771 | 805 | 839 | 873 |
| 670 | 704 | 738 | 772 | 806 | 840 | 874 |
| 671 | 705 | 739 | 773 | 807 | 841 | 875 |
| 672 | 706 | 740 | 774 | 808 | 842 | 876 |
| 673 | 707 | 741 | 775 | 809 | 843 | 877 |
| 674 | 708 | 742 | 776 | 810 | 844 | 878 |
| 675 | 709 | 743 | 777 | 811 | 845 | 879 |
| 676 | 710 | 744 | 778 | 812 | 846 | 880 |
| 677 | 711 | 745 | 779 | 813 | 847 | 881 |
| 678 | 712 | 746 | 780 | 814 | 848 | 882 |
| 679 | 713 | 747 | 781 | 815 | 849 | 883 |
| 680 | 714 | 748 | 782 | 816 | 850 | 884 |
| 681 | 715 | 749 | 783 | 817 | 851 | 885 |
| 682 | 716 | 750 | 784 | 818 | 852 | 886 |
| 683 | 717 | 751 | 785 | 819 | 853 | 887 |
| 684 | 718 | 752 | 786 | 820 | 854 | 888 |
| 685 | 719 | 753 | 787 | 821 | 855 | 889 |
| 686 | 720 | 754 | 788 | 822 | 856 | 890 |
| 687 | 721 | 755 | 789 | 823 | 857 | 891 |
| 688 | 722 | 756 | 790 | 824 | 858 | 892 |
| 689 | 723 | 757 | 791 | 825 | 859 | 893 |
| 690 | 724 | 758 | 792 | 826 | 860 | 894 |
| 691 | 725 | 759 | 793 | 827 | 861 | 895 |
| 692 | 726 | 760 | 794 | 828 | 862 | 896 |
| 693 | 727 | 761 | 795 | 829 | 863 | 897 |
| 694 | 728 | 762 | 796 | 830 | 864 | 898 |
| 695 | 729 | 763 | 797 | 831 | 865 | 899 |
| 696 | 730 | 764 | 798 | 832 | 866 | 900 |
| 697 | 731 | 765 | 799 | 833 | 867 | 901 |
| 698 | 732 | 766 | 800 | 834 | 868 | 902 |

The selection of the correct quotient will therefore depend on the selection of the first absorption region and on the second absorption region. A person skilled in the art will therefore know which quotient to choose in order to determine whether the measurement result is plausible. For example, if the first absorption region is selected at the expected absorption maximum of the blue indole dye mixture, i.e., at approximately 660 nm or, preferably, at exactly 660 nm, then:

when the second absorption region is from 670 to <680 nm, the quotient will be >1.1, when the second absorption region is from 680 to <690 nm, the quotient will be >1.2, when the second absorption region is from 690 to <700 nm, the quotient will be >1.3, when the second absorption region is from 700 to <710 nm, the quotient will be >1.4, when the second absorption region is from 710 to <720 nm, the quotient will be >1.5, when the second absorption region is from 720 to <730 nm, the quotient will be >1.7, when the second absorption region is from 730 to <740 nm, the quotient will be >1.9, when the second absorption region is from 740 to <750 nm, the quotient will be >2.1, when the second absorption region is from 750 to <760 nm, the quotient will be >2.3, when the second absorption region is from 760 to <770 nm, the quotient will be >2.8, and when the second absorption region is from 770 to <780 nm, the quotient will be >3.3.

In the determination of the ammonium content by the Berthelot method, a chlorinating agent, a phenol derivative and nitroprusside as catalyst are added to the sample in the alkaline region, and a certain time, which is generally between 5 and 30 minutes, preferably between 10 and 20 minutes, is typically awaited in order that the detection reaction can take place. A blue-colored indophenol thereby forms over several reaction steps. The extinction determined in the absorption region of the indophenol correlates with the ammonium content of the sample in certain measurement ranges known to the person skilled in the art. The measurement of the ammonium content can be carried out in accordance with the present invention using any variant of the Berthelot method in which nitroprusside is used as a catalyst.

The ammonium content of a sample is a sample's content of ammonium compounds present which can be converted into ammonia when the sample is rendered alkaline or are in the form of ammonia in an alkaline sample. The alkaline pH can thereby be between pH 10 and 13, preferably between pH 11 and 12, very preferably about pH 11.5. The alkaline pH of the aqueous sample with an alkaline pH can, for example, be provided by adding a base or hydroxide solutions. Use can, for example, be made of aqueous LiOH solutions, NaOH solutions and KOH solutions, preferably a sodium hydroxide solution. Examples of ammonium compounds are therefore ammonium salts, ammonium hydroxide and ammonia.

The chlorinating agent can, for example, be dichloroisocyanurate (DIC), dichloroisocyanuric acid or sodium hypochlorite. The phenol derivative can, for example, be phenol or 2-substituted phenols, such as 2-chlorophenol, thymol or salicylates, or 2-hydroxy benzyl alcohol. It is also possible to use the method described in DIN 38406/5, in which dichloroisocyanuric acid and sodium salicylate is used.

Various known methods can be used to provide the blue indole dye mixture of the aqueous sample. The blue indole dye mixture can, for example, be provided by providing the aqueous sample, adding a base to the aqueous sample so as to provide the aqueous sample with an alkaline pH, and adding to the aqueous sample with the alkaline pH a chlorinating agent, a phenol derivative, and nitroprusside, so as to obtain the blue indole dye mixture.

The blue indole dye mixture of the aqueous sample can alternatively be provided by providing the aqueous sample, mixing a chlorinating agent and an alkaline buffer to obtain a first mixture, mixing the aqueous sample and the fist mixture to obtain a second mixture, and adding a phenol derivative and a nitroprusside to the second mixture to obtain the blue indole dye mixture. A person skilled in the art would also know that all of the above can be added together at the same time. A person skilled in the art can also directly add all of the above into, for example, a cuvette for subsequent analysis.

The phenol derivative can, for example, be 2-hydroxy benzyl alcohol. The nitroprusside can, for example, be sodium nitroprusside. The chlorinating agent can, for example, be sodium hypochlorite. The alkaline buffer can, for example, be an alkaline citrate buffer.

After the chlorinating agent, the phenol derivative, and nitroprusside as a catalyst are added to the aqueous sample with an alkaline pH, a certain time, which is generally between 5 and 30 minutes, preferably between 10 and 20 minutes, should typically elapse in order to allow the detection reaction to take place. A blue-colored indophenol (i.e., the blue indole dye mixture) thereby forms over several reaction steps. The extinction determined in the absorption region of the indophenol correlates with the ammonium content of the sample in certain measurement ranges known to the person skilled in the art. The measurement of the ammonium content can be carried out in accordance with the present invention using any variant of the Berthelot method in which nitroprusside is used as catalyst.

Starting Materials Generally

Reagent 1: 10-74 g/l of 2-hydroxybenzyl alcohol premixed with 4-10 g/l of nitroprusside Reagent 2: 10-250 g/l of sodium citrate dihydrate (alkaline adjusted with NaOH to a pH of >12)

Reagent 3: 0.3-10 g/l of sodium hypochlorite (NaOCl)

Five aqueous samples containing Ammonium nitrogen ($NH_4$—N) were previously determined using conventional methods. These aqueous samples contained the following amounts of Ammonium nitrogen ($NH_4$—N):

Aqueous Sample 1: 1 ppm $NH_4$—N

Aqueous Sample 2: 2 ppm $NH_4$—N(synthetic effluent)

Aqueous Sample 3: 5 ppm $NH_4$—N

Aqueous Sample 4: 10 ppm $NH_4$—N

Aqueous Sample 5: 1,000 ppm $NH_4$—N

EXAMPLE 5 ml of each of the aqueous samples 1-5 to be tested were provided. To each 5 ml aqueous sample was added 2.0 ml of a 1:1 mixture of:

5.15 g/l of sodium hypochlorite (as Reagent 3) and 100 g/l of sodium citrate dihydrate alkaline which was adjusted with NaOH to a pH of >12 (as Reagent 2).

The resulting mixture was then stirred for 3 minutes at room temperature (i.e., approximately 25° C.);

1 ml of 42 g/l of 2-hydroxybenzyl alcohol and 7 g/l of sodium nitroprusside (as Reagent 1) was then added. The resulting mixture was then stirred for 3 minutes at room temperature (i.e., approximately 25° C.). The blue indole dye thereby completely evolved after an elapsed time of approximately 15 minutes to provide the blue indole dye mixture.

1 ml of the blue indole dye mixture of each of aqueous samples 1-5 was then respectively pipetted into a 2 mm cuvette and analyzed photometrically using a DR 3900 Spectrophotometer from Hach® at a wavelength of 660 nm (i.e., the first absorption region) and at respective wavelengths of 670 nm, 680 nm, 690 nm, 700 nm, 710 nm, 720 nm, 730 nm, 740 nm, 750 nm, 760 nm, 770 nm and 780 nm (as the respective second absorption region). Samples of the data thereby obtained is set forth in Tables 4-15 below. More complete data is set forth as FIG. 2.

TABLE 4

| Concentration ppm $NH_4$-N | Absorbance E 660 nm | Absorbance E 670 nm | Quotient E 660 nm/E 670 nm |
|---|---|---|---|
| 1 | 0.144 | 0.143 | 1.01 |
| 2 | 0.270 | 0.267 | 1.01 |
| 5 | 0.717 | 0.710 | 1.01 |
| 10 | 1.324 | 1.318 | 1.00 |
| 1,000 | 1.137 | 0.999 | 1.14 |

TABLE 5

| Concentration ppm $NH_4$-N | Absorbance E 660 nm | Absorbance E 680 nm | Quotient E 660 nm/E 680 nm |
|---|---|---|---|
| 1 | 0.144 | 0.139 | 1.04 |
| 2 | 0.270 | 0.259 | 1.04 |
| 5 | 0.717 | 0.685 | 1.05 |
| 10 | 1.324 | 1.279 | 1.04 |
| 1,000 | 1.137 | 0.826 | 1.38 |

TABLE 6

| Concentration ppm $NH_4$-N | Absorbance E 660 nm | Absorbance E 690 nm | Quotient E 660 nm/E 690 nm |
|---|---|---|---|
| 1 | 0.144 | 0.132 | 1.09 |
| 2 | 0.270 | 0.246 | 1.10 |
| 5 | 0.717 | 0.648 | 1.11 |
| 10 | 1.324 | 1.218 | 1.09 |
| 1,000 | 1.137 | 0.646 | 1.76 |

TABLE 7

| Concentration ppm $NH_4$-N | Absorbance E 660 nm | Absorbance E 700 nm | Quotient E 660 nm/E 700 nm |
|---|---|---|---|
| 1 | 0.144 | 0.124 | 1.16 |
| 2 | 0.270 | 0.23 | 1.17 |
| 5 | 0.717 | 0.606 | 1.18 |
| 10 | 1.324 | 1.141 | 1.16 |
| 1,000 | 1.137 | 0.486 | 2.34 |

TABLE 8

| Concentration ppm $NH_4$-N | Absorbance E 660 nm | Absorbance E 710 nm | Quotient E 660 nm/E 710 nm |
|---|---|---|---|
| 1 | 0.144 | 0.116 | 1.24 |
| 2 | 0.270 | 0.213 | 1.27 |
| 5 | 0.717 | 0.561 | 1.28 |
| 10 | 1.324 | 1.061 | 1.25 |
| 1,000 | 1.137 | 0.353 | 3.22 |

TABLE 9

| Concentration ppm $NH_4$-N | Absorbance E 660 nm | Absorbance E 720 nm | Quotient E 660 nm/E 720 nm |
|---|---|---|---|
| 1 | 0.144 | 0.107 | 1.35 |
| 2 | 0.270 | 0.198 | 1.36 |
| 5 | 0.717 | 0.518 | 1.38 |
| 10 | 1.324 | 0.982 | 1.35 |
| 1,000 | 1.137 | 0.261 | 4.36 |

TABLE 10

| Concentration ppm $NH_4$-N | Absorbance E 660 nm | Absorbance E 730 nm | Quotient E 660 nm/E 730 nm |
|---|---|---|---|
| 1 | 0.144 | 0.098 | 1.47 |
| 2 | 0.270 | 0.180 | 1.50 |
| 5 | 0.717 | 0.471 | 1.52 |
| 10 | 1.324 | 0.894 | 1.48 |
| 1.000 | 1.137 | 0.188 | 6.05 |

TABLE 11

| Concentration ppm $NH_4$-N | Absorbance E 660 nm | Absorbance E 740 nm | Quotient E 660 nm/E 740 nm |
|---|---|---|---|
| 1 | 0.144 | 0.089 | 1.62 |
| 2 | 0.270 | 0.162 | 1.67 |
| 5 | 0.717 | 0.425 | 1.69 |
| 10 | 1.324 | 0.805 | 1.64 |
| 1,000 | 1.137 | 0.139 | 8.18 |

TABLE 12

| Concentration ppm $NH_4$-N | Absorbance E 660 nm | Absorbance E 750 nm | Quotient E 660 nm/E 750 nm |
|---|---|---|---|
| 1 | 0.144 | 0.079 | 1.82 |
| 2 | 0.270 | 0.144 | 1.88 |
| 5 | 0.717 | 0.376 | 1.91 |
| 10 | 1.324 | 0.712 | 1.86 |
| 1,000 | 1.137 | 0.103 | 11.04 |

TABLE 13

| Concentration ppm $NH_4$-N | Absorbance E 660 nm | Absorbance E 760 nm | Quotient E 660 nm/E 760 nm |
|---|---|---|---|
| 1 | 0.144 | 0.07 | 2.06 |
| 2 | 0.270 | 0.126 | 2.14 |
| 5 | 0.717 | 0.329 | 2.18 |
| 10 | 1.324 | 0.62 | 2.14 |
| 1,000 | 1.137 | 0.078 | 14.58 |

TABLE 14

| Concentration ppm $NH_4$-N | Absorbance E 660 nm | Absorbance E 770 nm | Quotient E 660 nm/E 770 nm |
|---|---|---|---|
| 1 | 0.144 | 0.06 | 2.40 |
| 2 | 0.270 | 0.108 | 2.50 |
| 5 | 0.717 | 0.282 | 2.54 |

TABLE 14-continued

| Concentration ppm $NH_4$-N | Absorbance E 660 nm | Absorbance E 770 nm | Quotient E 660 nm/E 770 nm |
|---|---|---|---|
| 10 | 1.324 | 0.53 | 2.50 |
| 1,000 | 1.137 | 0.059 | 19.27 |

TABLE 15

| Concentration ppm $NH_4$-N | Absorbance E 660 nm | Absorbance E 780 nm | Quotient E 660 nm/E 780 nm |
|---|---|---|---|
| 1 | 0.144 | 0.051 | 2.82 |
| 2 | 0.270 | 0.091 | 2.97 |
| 5 | 0.717 | 0.238 | 3.01 |
| 10 | 1.324 | 0.446 | 2.97 |
| 1,000 | 1.137 | 0.045 | 25.27 |

A graph of the absorption data of each of aqueous samples 1-5 at various wavelengths from 500 to 900 nm is shown in FIG. 1. The data for FIG. 1 for the wavelengths 660 nm to 780 nm is set forth in Tables 4-15 above.

A comparison of the quotients of Tables 4-15 makes clear that the quotients of each of aqueous samples 1-4 are for the most part remarkably close to each other. For Table 10, for example, the quotient is approximately 1.5. Starting from Table 10, where a wavelength of 730 nm was used, shows that choosing a wavelength >730 nm causes the quotient to increase, while a choice of a wavelength between approximately 670 nm and 730 nm would cause the quotient to decrease. The reason for this variance is due to the degree of extinction as is shown in FIG. 1. Aqueous sample 5 exhibits an earlier absorption maximum of approximately 645 nm (see FIG. 1) and a corresponding steeper decline in the area of measurement of the second absorption region. A measurement of the second absorption region anywhere from 675 nm to 775 nm will therefore always result in a quotient which is significantly different from those of aqueous samples 1-4. Based solely on the absorbance of the aqueous solution 5 at the first absorption region of 660 nm, i.e., 1.137, a person skilled in the art would normally reasonably conclude that the fifth aqueous sample has a ppm $NH_4$—N of approximately 7 in that it clearly lies between the curves for 5 ppm $NH_4$—N and 10 ppm $NH_4$—N. However, the high quotient of 6.05 based on the measurement at the second absorption region of 730 nm clearly shows this result to not be plausible. The data for the aqueous sample 5 can thereby be discarded as not plausible by measuring the same sample twice. A separate measurement to determine the amount of nitroprusside remaining is not thereby required.

The present invention is not limited to embodiments described herein; reference should be had to the appended claims.

The invention claimed is:

1. A method for determining of a plausibility of a measurement result of a determination of an ammonium content of an aqueous sample, the method comprising:

providing a blue indole dye mixture of the aqueous sample with an alkaline pH by, providing the aqueous sample;

adding a base, a chlorinating agent, a phenol derivative, and nitroprusside, so as to obtain the blue indole dye mixture, whereas, the method further comprises:

determining a first extinction value of the blue indole dye mixture in a first absorption region from 650 to 670 nm, the first extinction value being the measurement result;

determining a second extinction value of the blue indole dye mixture in a second absorption region from 670 to 775 nm, wherein the second absorption region is distant from the first absorption region;

dividing the first extinction value by the second extinction value so as to obtain a quotient; and determining the measurement result to not be plausible if the quotient ≥1.1.

2. The method as recited in claim 1, characterized in that the quotient is ≥1.5.

3. The method as recited in claim 1, characterized in that:

the first absorption region is substantially 660 nm; and wherein, when the second absorption region is from 670 to <680 nm, the quotient is >1.1, wherein, when the second absorption region is from 680 to <690 nm, the quotient is >1.2, wherein, when the second absorption region is from 690 to <700 nm, the quotient is >1.3, wherein, when the second absorption region is from 700 to <710 nm, the quotient is >1.4, wherein, when the second absorption region is from 710 to <720 nm, the quotient is >1.5, wherein, when the second absorption region is from 720 to <730 nm, the quotient is >1.7, wherein, when the second absorption region is from 730 to <740 nm, the quotient is >1.9, wherein, when the second absorption region is from 740 to <750 nm, the quotient is >2.1, wherein, when the second absorption region is from 750 to <760 nm, the quotient is >2.3, wherein, when the second absorption region is from 760 to <770 nm, the quotient is >2.8, and wherein, when the second absorption region is from 770 to <780 nm, the quotient is >3.3.

4. The method as recited in claim 1, characterized in that the chlorinating agent is dichloroisocyanuric acid or sodium hypochlorite.

5. The method as recited in claim 1, characterized in that the phenol derivative is 2-chlorophenol or 2-hydroxy benzyl alcohol.

6. The method as recited in claim 1, characterized in that the alkaline pH of the aqueous sample with the alkaline pH is provided by adding a sodium hydroxide solution.

7. The method as recited in claim 1, characterized in that the alkaline pH is between pH 10 and 13.

8. The method as recited in claim 1, wherein the blue indole dye mixture of the aqueous sample is provided by:

providing the aqueous sample;

mixing a chlorinating agent and an alkaline buffer to obtain a first mixture;

mixing the aqueous sample and the fist mixture to obtain a second mixture;

adding a phenol derivative and a nitroprusside to the second mixture to obtain the blue indole dye mixture.

9. The method as recited in claim 8, characterized in that the phenol derivative is 2-hydroxy benzyl alcohol.

10. The method as recited in claim 8, characterized in that the chlorinating agent is sodium hypochlorite.

11. The method as recited in claim 8, characterized in that the alkaline buffer is an alkaline citrate buffer.

* * * * *